US012683281B2

(12) United States Patent
Nemoto

(10) Patent No.: US 12,683,281 B2
(45) Date of Patent: Jul. 14, 2026

(54) ANTENNA DEVICE

(71) Applicant: Murata Manufacturing Co., Ltd., Nagaokakyo (JP)

(72) Inventor: Takaya Nemoto, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 53 days.

(21) Appl. No.: 18/404,905

(22) Filed: Jan. 5, 2024

(65) Prior Publication Data

US 2024/0154315 A1 May 9, 2024

Related U.S. Application Data

(63) Continuation of application No. PCT/JP2022/024160, filed on Jun. 16, 2022.

(30) Foreign Application Priority Data

Jul. 6, 2021 (JP) ................................ 2021-112219

(51) Int. Cl.
*H01Q 9/04* (2006.01)

(52) U.S. Cl.
CPC ........... *H01Q 9/045* (2013.01); *H01Q 9/0414* (2013.01)

(58) Field of Classification Search
CPC ............................ H01Q 9/045; H01Q 9/0414
See application file for complete search history.

(56) References Cited

U.S. PATENT DOCUMENTS

2011/0032154 A1 2/2011 Chung et al.
2013/0187830 A1* 7/2013 Warnick ............... H01Q 21/065 343/893
2015/0333407 A1* 11/2015 Yamagajo .............. H01Q 5/307 343/905
2019/0020110 A1* 1/2019 Paulotto ................. H01Q 5/392
2020/0295464 A1 9/2020 Komura et al.
2021/0367358 A1* 11/2021 He ....................... H01Q 25/001

(Continued)

FOREIGN PATENT DOCUMENTS

JP H02-202204 A 8/1990
JP 2005033353 A * 2/2005
JP 2010-081500 A 4/2010

(Continued)

OTHER PUBLICATIONS

International Search Report and Written Opinion mailed on Sep. 13, 2022, received for PCT Application PCT/JP2022/024160, filed on Jun. 16, 2022, 8 pages including English Translation.

(Continued)

*Primary Examiner* — Dieu Hien T Duong
(74) *Attorney, Agent, or Firm* — XSENSUS LLP

(57) ABSTRACT

An antenna device includes a ground plane, a flat-plate-shaped first feed element, a flat-plate-shaped second feed element, a first feed line connected to the first feed element, and a second feed line connected to the second feed element. The ground plane, the first feed element, and the second feed element are stacked respective order and spaced apart from each other. At least part of the second feed line is disposed in a same conductor layer as the ground plane and is disposed at a position that overlaps the first feed element as the ground plane is viewed from a plan view.

20 Claims, 14 Drawing Sheets

(56) References Cited

U.S. PATENT DOCUMENTS

2022/0031172 A1* 2/2022 He ....................... H01Q 9/0428

FOREIGN PATENT DOCUMENTS

| | | | |
|---|---|---|---|
| JP | 2020-068527 | A | 4/2020 |
| JP | 6798656 | B1 | 12/2020 |
| WO | 2020/117284 | A1 | 6/2020 |
| WO | 2020/261806 | A1 | 12/2020 |

OTHER PUBLICATIONS

Office Action issued on Apr. 14, 2026, in corresponding Chinese patent Application No. 202280047739.0, 9 pages.

* cited by examiner

ANTENNA DEVICE

CROSS-REFERENCE TO RELATED APPLICATIONS

The present application is a continuation of PCT application PCT/JP2022/024160, filed Jun. 16, 2022, and claims priority to Japanese application JP 2021-112219, filed Jul. 6, 2021, the entire contents of each of which being incorporated herein by reference.

TECHNICAL FIELD

The present disclosure relates to an antenna device.

BACKGROUND ART

A stacked patch antenna capable of radiating radio waves in two different frequency bands is disclosed in Patent Document 1 listed below. The stacked patch antenna disclosed in Patent Document 1 includes a ground plane, a low-frequency-side feed element disposed above the ground plane, and a high-frequency-side feed element disposed above the low-frequency-side feed element. The angle between the polarization direction of the high-frequency-side feed element and the polarization direction of the low-frequency-side feed element is greater than 0° and less than 90°. Therefore, degradation of antenna characteristics is suppressed.

CITATION LIST

Patent Document

Patent Document 1: International Publication No. 2020/261806

SUMMARY

Technical Problems

As the routing of feed lines connected to the feed elements becomes more complex, designing the patterns of the feed lines becomes increasingly difficult. For example, it may be necessary to increase the number of conductor layers used for the feed lines. Increasing the degree of freedom in the arrangement of feed lines makes pattern design easier. An aspect of the present disclosure is to provide an antenna device that can increase the degree of freedom in the arrangement of feed lines.

Solutions to Problems

An aspect of the present disclosure provides an antenna device that includes a ground plane, a flat-plate-shaped first feed element, a flat-plate-shaped second feed element, a first feed line connected to the first feed element, and a second feed line connected to the second feed element. The ground plane, the first feed element, and the second feed element are stacked respective order and spaced apart from each other. At least part of the second feed line is disposed in a same conductor layer as the ground plane and is disposed at a position that overlaps the first feed element as the ground plane is viewed from a plan view

Advantageous Effects

In the related art, a second feed line is disposed in a layer below a ground plane. In contrast, in the antenna device according to the aspect of the present disclosure, at least part of the second feed line is disposed within the same layer as the ground plane. In other words, the degree of freedom in the arrangement of feed lines can be increased.

DESCRIPTION OF EMBODIMENTS

First Embodiment

Figure 1:
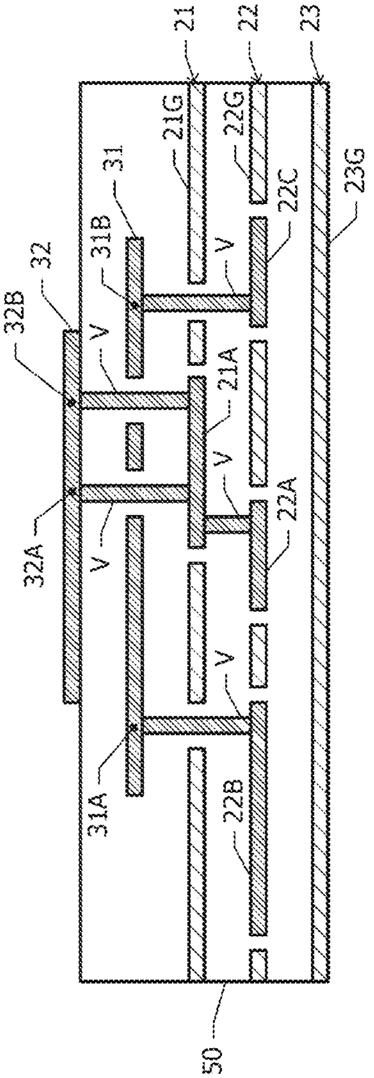
FIG. 1 is a sectional view of an antenna device according to a First Embodiment.

An antenna device according to a First Embodiment will be described while referring to the drawings from FIG. 1 to FIG. 10.

FIG. 1 is a sectional view of the antenna device according to the First Embodiment.

A dielectric multilayer substrate 50 includes a first layer conductor layer 21, a second layer conductor layer 22, a third layer conductor layer 23, a flat-plate-shaped first feed element 31, and a flat-plate-shaped second feed element 32. The first layer conductor layer 21 includes a ground plane 21G and a second feed line 21A. The ground plane 21G, the first feed element 31, and the second feed element 32 are stacked in this order and spaced apart from each other. The side where the first feed element 31 is disposed, as viewed from the first layer conductor layer 21, is defined as an upper side.

The second layer conductor layer 22 and the third layer conductor layer 23 are disposed in this order and spaced apart from each other below the first layer conductor layer 21. The second layer conductor layer 22 includes a ground plane 22G, a second layer second feed line 22A and first feed lines 22B and 22C. The third layer conductor layer 23 includes a ground plane 23G.

The second feed line 21A is disposed at a position overlapping the first feed element 31 when the ground plane 21G is viewed in plan view. For example, in plan view, the second feed line 21A is disposed inside the outer periphery of the first feed element 31. The second feed line 21A is connected to the second layer second feed line 22A through a via V. Furthermore, the second feed line 21A is connected to two feed points 32A and 32B of the second feed element 32 through two vias V that extend through clearance holes provided in the first feed element 31. A radio-frequency signal is supplied to the second feed element 32 via the second feed lines 21A and 22A. The two vias V connecting the second feed line 21A to the second feed element 32 are disposed at different positions in plan view from the via V connecting the second feed line 21A to the second layer second feed line 22A. In plan view, the first feed element 31 and the second feed element 32 partially overlap each other.

The first feed lines 22B and 22C are respectively connected to feed points 31A and 31B of the first feed element 31 through vias V that extend through clearance holes provided in the ground plane 21G of the first layer. A radio-frequency signal is supplied to the first feed element 31 via the first feed lines 22B and 22C.

The dimensions of the first feed element 31 in plan view are larger than the dimensions of the second feed element 32 in plan view. In other words, the resonant frequency of the first feed element 31 is lower than the resonant frequency of the second feed element 32. The area of the first feed element 31 in plan view is larger than the area of the second feed element 32 in plan view.

Next, the materials of the dielectric multilayer substrate 50 and conductor portions are described. For example, a low-temperature co-fired ceramic multilayer substrate (LTCC multilayer substrate), a multilayer substrate including a resin layer of a liquid crystal polymer having a low dielectric constant, a multilayer substrate including of a resin layer composed of a fluorine-based resin, or a ceramic multilayer substrate is used as the dielectric multilayer substrate 50. For example, Al, Cu, Au, Ag, or an alloy of any of these metals is used for the conductor portions.

Figure 2A:
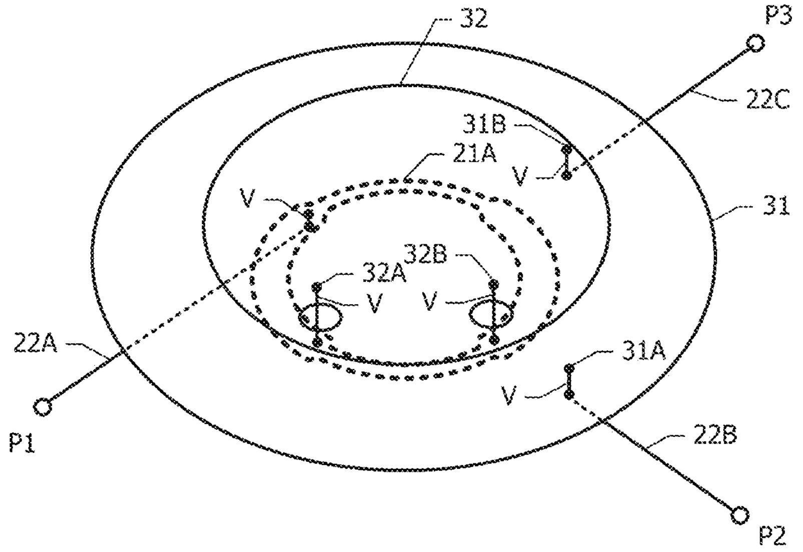
FIG. 2A is a schematic perspective view of the antenna device according to the First Embodiment.

FIG. 2A is a schematic perspective view of the antenna device according to the First Embodiment. In FIG. 2A, illustration of the ground planes 21G, 22G, and 23G (FIG. 1) is omitted. The first feed element 31 and the second feed element 32 are both circular in shape. The center of the first feed element 31 and the center of the second feed element 32 are aligned in plan view.

The first layer second feed line 21A has a circular shape in plan view and is disposed inside the outer periphery of the first feed element 31. In FIG. 2A, the second feed line 21A is illustrated by a dashed line. The second layer second feed line 22A is connected to the second layer second feed line 21A through a via V. Furthermore, the second feed line 21A is respectively connected to the two feed points 32A and 32B of the second feed element 32 through two vias V. The two vias V pass through clearance holes provided in the first feed element 31. A radio-frequency signal is supplied from the port P1 to the feed points 32A and 32B via the second layer second feed line 22A and the first layer second feed line 21A.

Figure 2B:
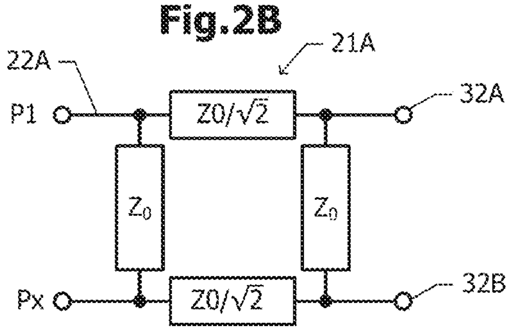
FIG. 2B is an equivalent circuit diagram of a second feed line of the antenna device according to the First Embodiment.

FIG. 2B is an equivalent circuit diagram of the second feed line 21A. The second feed line 21A forms a 90° hybrid circuit. In other words, the second feed line 21A consists of a combination of two transmission lines with a characteristic impedance of $Z_0$ and two transmission lines with a characteristic impedance of $Z_0/2^{1/2}$. The width of the two transmission lines with a characteristic impedance of $Z_0/2^{1/2}$ is greater than the width of the two transmission lines with a characteristic impedance of $Z_0$. The two transmission lines with characteristic impedance of $Z_0$ and the two transmission lines with characteristic impedance of $Z_0/2^{1/2}$ are connected in an alternating manner in a ring shape. The electrical length of each transmission line is ¼ of a wavelength corresponding to the resonant frequency of the second feed element 32.

The second feed line 22A is connected to one of the four ports of the 90° hybrid circuit. A radio-frequency signal is input to the 90° hybrid circuit from the port P1 via the second feed line 22A. The port that is adjacent to the port connected to the second feed line 22A, with the characteristic impedance $Z_0/2^{1/2}$ interposed therebetween, is connected to the feed point 32A. The port at a position diagonal to the port connected to the second feed line 22A is connected to the feed point 32B. The one remaining port of the 90° hybrid circuit is labeled Px.

When a radio-frequency signal is input from the port P1, the phase of the radio-frequency signal output at one feed point 32B is 90° later (lagging) than the phase of the radio-frequency signal output at the other feed point 32A. No signal is output to the port Px. Conversely, if a radio-frequency signal having a phase delay of 90° relative to the radio-frequency signal input to the feed point 32B is input to the feed point 32A, a radio-frequency signal is output from the port P1 but not from the port Px. Thus, the second feed line 21A has the function of supplying radio-frequency signals to the two feed points 32A and 32B with a phase difference of 90° between the radio-frequency signals.

For example, as illustrated in FIG. 2A, a 90° hybrid circuit is configured by increasing or decreasing the width of the transmission line every quarter of the circumference of a circular transmission line. The widths of portions that are opposite each other across the center of the circumference are equal to each other, and the widths of the adjacent portions are different from each other. In other words, the circular second feed line 21A includes two relatively thicker portions and two relatively thinner portions. The second feed line 21A may be shaped so as to follow the outer periphery of an annular shape other than a circle, for example, a square. In this case, the thicknesses of the portions extending along the two opposite sides may be equal to each other.

A line segment, the ends of which are the point connected to the second layer second feed line 22A and the point connected to the feed point 32B, passes through the center of the circumference. A portion from the point connected to the second layer second feed line 22A to the point connected to the feed point 32A is relatively thicker, and a portion connected between the two feed points 32A and 32B is relatively thinner.

A central angle formed by two radii extending from the center of the second feed element 32 illustrated in FIG. 2A to the two feed points 32*a* and 32*b* is 90°. Since radio-frequency signals having a phase difference of 90° are supplied to these two feed points 32A and 32B, the radio waves radiated from the second feed element 32 are circularly polarized waves.

A central angle formed by two radii extending from the center of the first feed element 31 illustrated in FIG. 2A to the two feed points 31*a* and 31*b* is 90°. When a radio-frequency signal is supplied to one of the feed points 31A and 31B, the radio waves radiated from the first feed element 31 are linearly polarized waves. When radio-frequency signals having a phase difference of 90° are supplied to the feed points 31A and 31B, the radio waves radiated from the first feed element 31 are circularly polarized waves.

The ground plane 21G of the first layer (FIG. 1), the first feed element 31, and the second feed element 32 form a stacked patch antenna. In a typical stacked patch antenna, the ground plane 21G (FIG. 1) is disposed over the entirety of a region overlapping the first feed element 31 in plan view, except for the clearance holes through which the vias V for feeding power extend. In contrast, in the First Embodiment, the second feed line 21A is disposed in the same first layer conductor layer 21 (FIG. 1) as the ground plane 21G.

Hereafter, the effect that a configuration in which the second feed line 21A is disposed in the same first layer conductor layer 21 as the ground plane 21G has on the antenna characteristics will be explained.

When a radio-frequency signal is supplied to the first feed element 31, an electric field is concentrated between the edge of the first feed element 31 and the ground plane 21G. Since the electric field is not concentrated in the region where the second feed line 21A is disposed, the second feed line 21A has little effect on the operation of the first feed element 31. A simulation was performed to confirm that the second feed line 21A has little effect on the operation of the first feed element 31. The results of the simulation will be described while referring to the drawings from FIG. 3A to FIG. 4B.

Figure 3A:
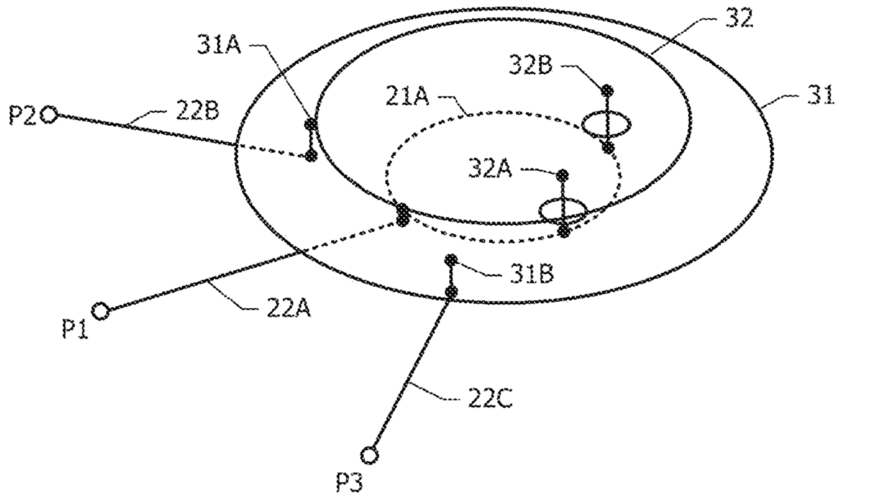
FIG. 3A and FIG. 3B are perspective views illustrating two simulation models of the antenna device.
Figure 3B:
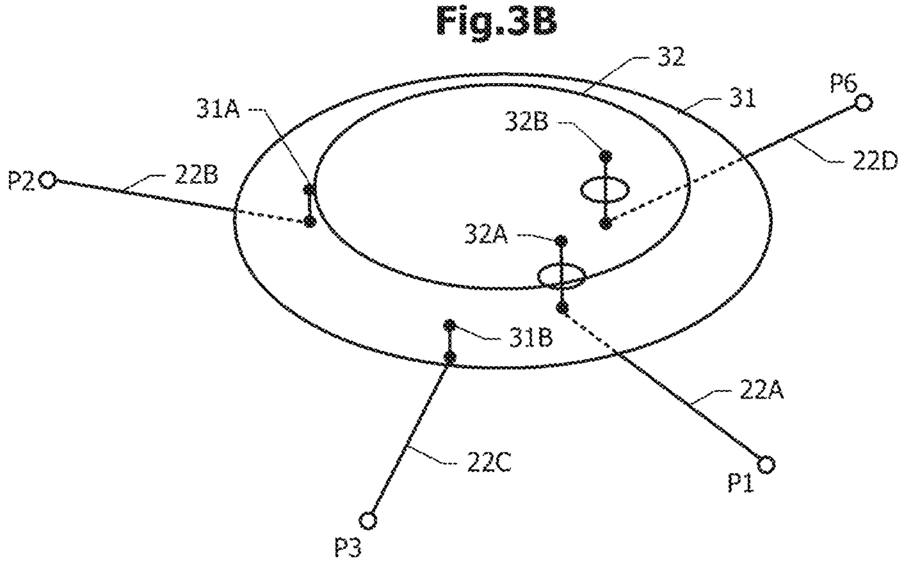

FIG. 3A and FIG. 3B are perspective views illustrating two simulation models of the antenna device. In the simulation model illustrated in FIG. 3A, the second feed line 21A is disposed in the first layer conductor layer 21 (FIG. 1), similarly to as in the antenna device according to the First Embodiment (FIGS. 1 and 2). A radio-frequency signal is supplied from a port P1 to the two feed points 32A and 32B of the second feed element 32 via the second layer second feed line 22A and the first layer second feed line 21A. Radio-frequency signals are supplied from ports P2 and P3 to the two feed points 31A and 31B of the first feed element 31 via the first feed lines 22B and 22C, respectively.

In the simulation model illustrated in FIG. 3B, the first layer second feed line 21A (FIG. 3A) is not disposed. Radio-frequency signals are supplied from two ports P1 and P6 to the two feed points 32A and 32B of the second feed element 32 via second feed lines 22A and 22D, respectively. Reflection coefficients S(2, 2) and S(3, 3) were obtained for when radio-frequency signals were input from the ports P2 and P3.

Figure 4A:
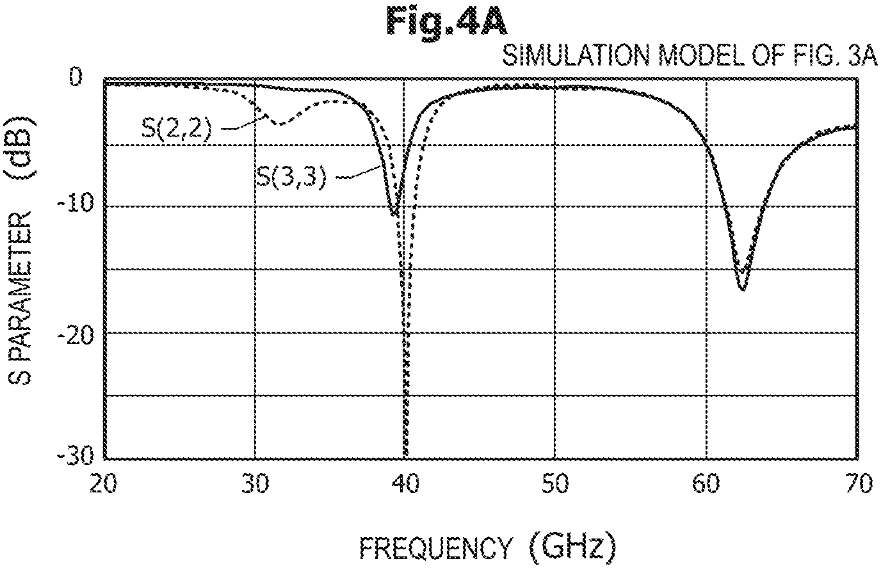
FIG. 4A and FIG. 4B are graphs respectively illustrating the reflection coefficients of the simulation models in FIGS. 3A and 3B.
Figure 4B:
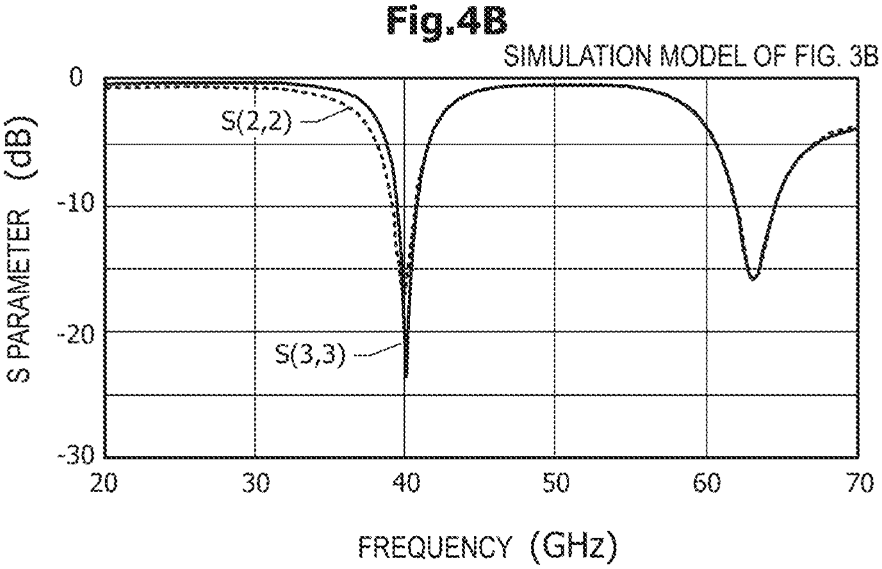

FIG. 4A and FIG. 4B are graphs illustrating the reflection coefficients of the simulation models in FIGS. 3A and 3B, respectively. The horizontal axis represents the frequency in units of "GHz" and the vertical axis represents the value of the S-parameter in units of "dB". The reflection coefficients S(2, 2) and S(3, 3) exhibit downward peaks at the resonant frequency of 40 GHz of the first feed element 31 in the simulation models in both FIG. 3A and FIG. 3B. The simulation confirmed that the operation of the first feed element 31 is not significantly affected by the second feed line 21A being disposed in the same first layer conductor layer 21 as the ground plane 21G (FIG. 1).

In a typical patch antenna, a ground plane is disposed between a feed element and a feed line in order to increase the isolation between the feed element and the feed line. In the antenna device according to the First Embodiment, however, a ground plane is not disposed between the second feed element 32 (FIG. 1) and the second feed line 21A (FIG. 1). Next, referring to the drawings from FIG. 5A to FIG. 6, the effect that a configuration in which a ground plane is not disposed between the second feed element 32 and the second feed line 21A has on the antenna characteristics will be explained.

A simulation was performed in order to confirm the degree of isolation between the second feed element 32 and the second feed line 21A.

Figure 5A:
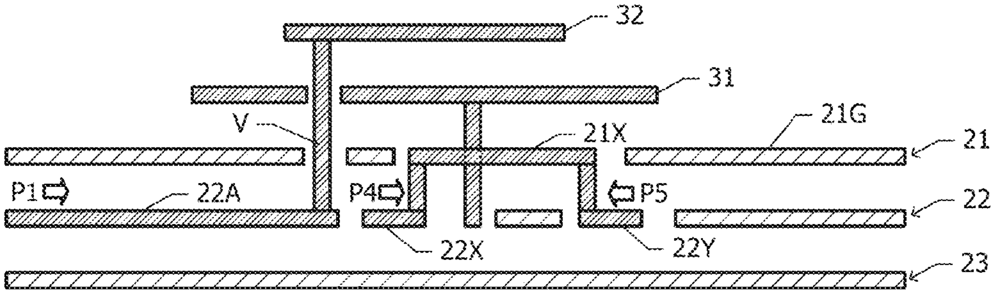
FIG. 5A and FIG. 5B are sectional views of antenna devices to be simulated.
Figure 5B:
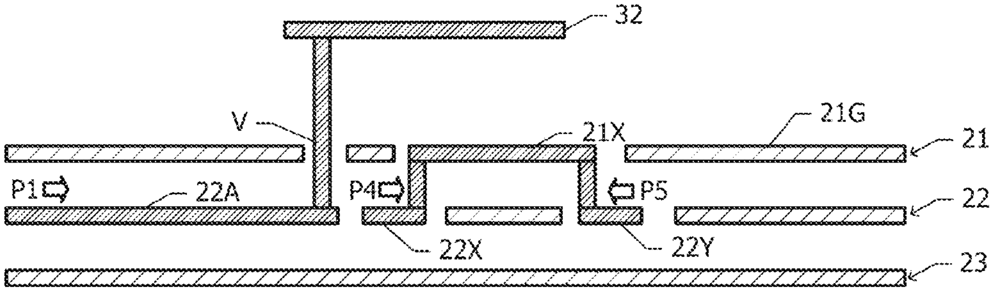

FIG. 5A and FIG. 5B are sectional views illustrating simulation models of an antenna device. In the simulation model illustrated in FIG. 5A, a wiring line 21X is disposed in the first layer conductor layer 21 instead of the second feed line 21A of the antenna device according to the First Embodiment. The two ends of the wiring line 21X are respectively connected to wiring lines 22X and 22Y disposed in the second layer conductor layer 22.

The first feed element 31 is disposed between the ground plane 21G and the wiring line 21X disposed in the first layer conductor layer 21 and the second feed element 32. A radio-frequency signal is supplied to the second feed element 32 from the second feed line 22A disposed in the second layer conductor layer 22 through a via V extending through the ground plane 21G and the first feed element 31. The resonant frequency of the first feed element 31 is 40 GHz and the resonant frequency of the second feed element 32 is 60 GHz.

In the simulation model illustrated in FIG. 5B, the first feed element 31 is removed from the simulation model illustrated in FIG. 5A.

The second feed line 22A is connected to the port P1, and the wiring lines 22X and 22Y are respectively connected to ports P4 and P5. S-parameters S(1, 4) and S(1, 5) from the port P1 to the ports P4 and P5 were obtained by simulation for when a radio-frequency signal was input from the port P1.

Figure 6:
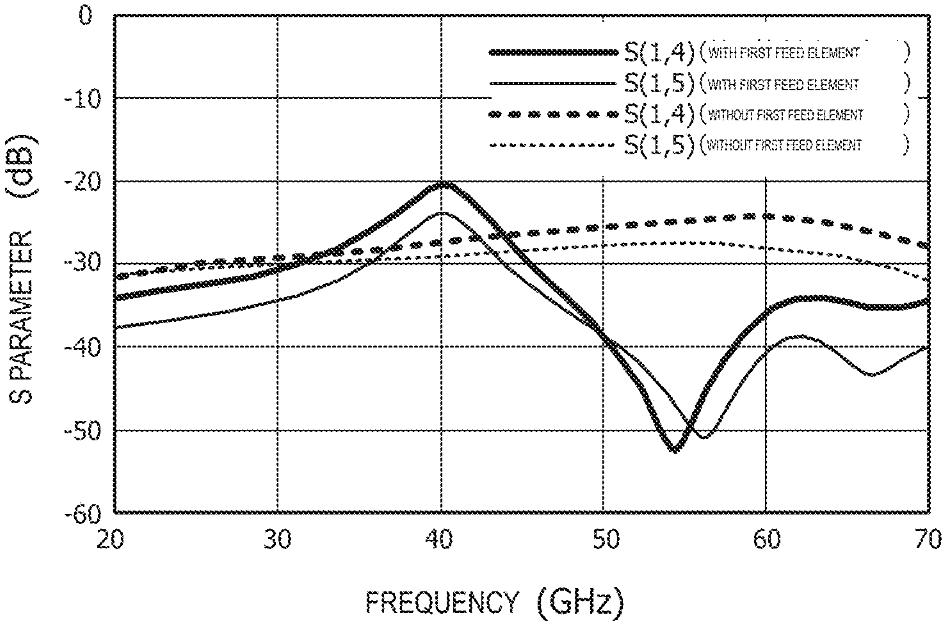
FIG. 6 is a graph illustrating simulation results of the antenna devices to be simulated illustrated in FIGS. 5A and 5B.

FIG. 6 is a graph illustrating the simulation results. The horizontal axis represents the frequency in units of "GHz" and the vertical axis represents the calculated value of the S-parameter in units of "dB". The thick solid line and the thin solid line in the graph in FIG. 6 respectively illustrate the pass coefficients S(1, 4) and S(1, 5) of the simulation model illustrated in FIG. 5A. The thick dashed line and the thin dashed line respectively illustrate the pass coefficients S(1, 4) and S(1, 5) of the simulation model illustrated in FIG. 5B.

In the simulation model in which the first feed element 31 is disposed (FIG. 5A), we can see that S(1, 4) and S(1, 5) are around 10 dB lower in the vicinity of the resonant frequency of 60 GHz of the second feed element 32 compared to the simulation model in which the first feed element 31 is not disposed (FIG. 5B). This means that the isolation between the second feed element 32 and the wiring line 21X is high.

It was confirmed that the isolation between the second feed element 32 and the wiring line 21X is improved when the first feed element 31 is disposed between the second feed element 32 and the wiring line 21X, as illustrated in FIG. 5A. This means that in the antenna device according to the First Embodiment (FIG. 1 and FIG. 2), a reduction in isolation between the second feed element 32 and the second feed line 21A is suppressed (i.e., isolation is achieved). At the resonant frequency of 60 GHz of the second feed element 32, S(1, 4) and S(1, 5) are less than or equal to −35 dB. This means that sufficient isolation is secured between the second feed element 32 and the second feed line 21A in the antenna device according to the First Embodiment.

Next, the beneficial positional relationship between the feed points 31A and 31B of the first feed element 31 and the feed points 32A and 32B of the second feed element 32 will be described while referring to the drawings from FIG. 7A to FIG. 10.

Figure 7A:
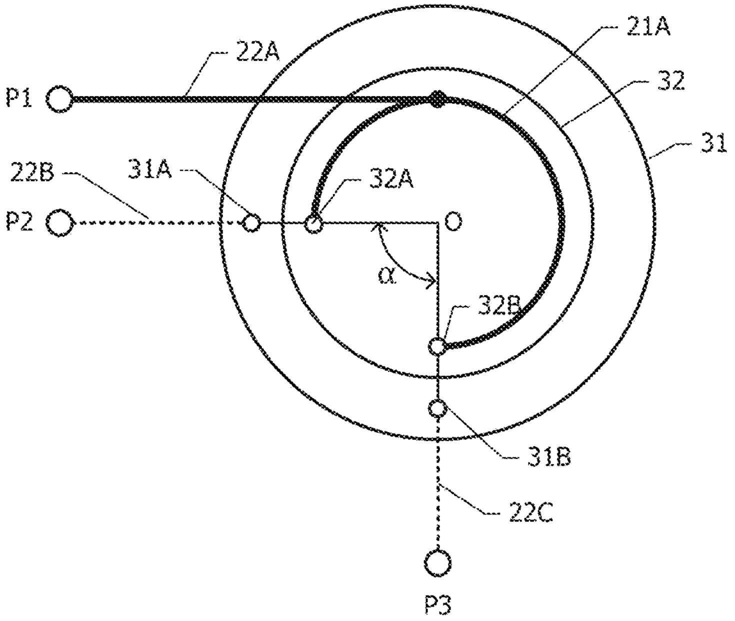
FIG. 7A and FIG. 7B are plan views focusing on the positions of feed points of a first feed element and a second feed element.
Figure 7B:
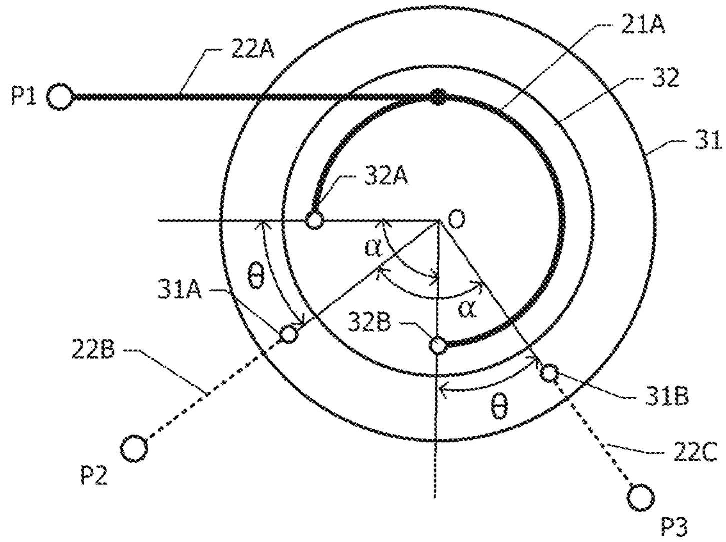

FIG. 7A and FIG. 7B are plan views focusing on the positions of the feed points of the first feed element 31 and the second feed element 32. The geometric centers of the first feed element 31 and the second feed element 32 in plan view are labeled O. A central angle α formed by two radii from the geometric center O to the two feed points 31A and 31B of the first feed element 31, and a central angle α formed by two radii from the geometric center O to the two feed points 32A and 32B of the second feed element 32, are both 90°.

FIG. 7A illustrates a state in which, in plan view, the geometric center O, one feed point 31A of the first feed element 31, and one feed point 32A of the second feed element 32 are positioned on a single straight line, and the geometric center O, the other feed point 31B of the first feed element 31, and the other feed point 32B of the second feed element 32 are also positioned on a straight line. FIG. 7B illustrates a state in which the two feed points 31A and 31B of the first feed element 31 have been rotated and shifted by an angle θ around the geometric center O. The state illustrated in FIG. 7A corresponds to an angle θ=0°.

A radio-frequency signal is supplied from the port P1 to the two feed points 32A and 32B of the second feed element 32 via the second feed lines 22A and 21A. Radio-frequency signals are supplied from the ports P2 and P3 to the feed points 31A and 31B of the first feed element 31 via the first feed lines 22B and 22C, respectively.

Figure 8:
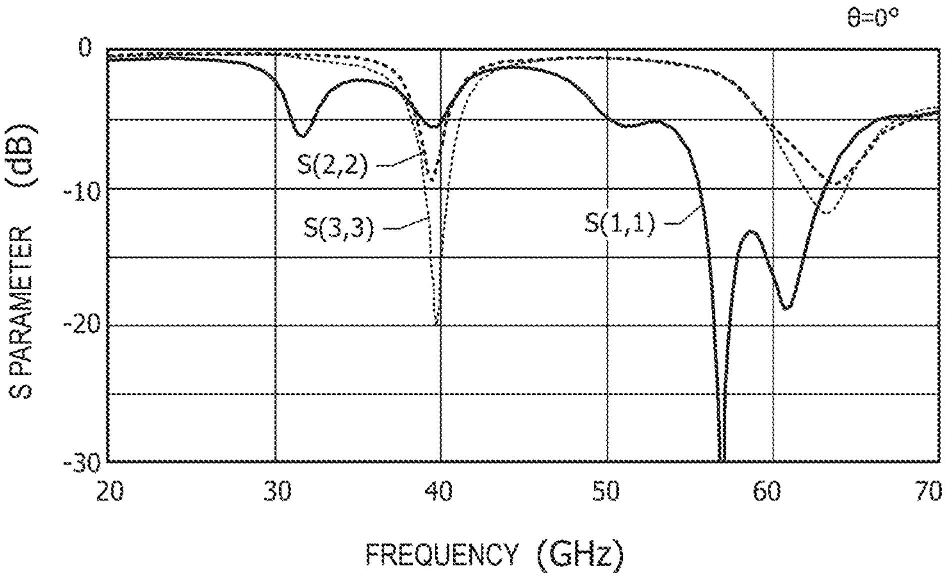
FIG. 8 is a graph illustrating simulation results of reflection coefficients S(1, 1), S(2, 2), and S(3, 3) obtained when radio-frequency signals are input from ports P1, P2, and P3, respectively, at an angle θ=0°.

FIG. 8 is a graph illustrating simulation results of reflection coefficients S(1, 1), S(2, 2), and S(3, 3) for when radio-frequency signals are input from the ports P1, P2, and P3, respectively, when the angle θ=0°. The horizontal axis represents the frequency in units of "GHz" and the vertical axis represents the calculated value of the S-parameter in units of "dB". The solid line, the thick dashed line, and the thin dashed line in the graph respectively illustrate the reflection coefficients S(1, 1), S(2, 2), and S(3, 3). It can be seen that the first feed element 31 resonates in the vicinity of a frequency of 40 GHz, and the second feed element 32 resonates in the vicinity of a frequency of 60 GHz. The trends of the reflection coefficients S(1, 1), S(2, 2), and S(3, 3) did not change significantly even when the angle θ was varied.

Figure 9A:
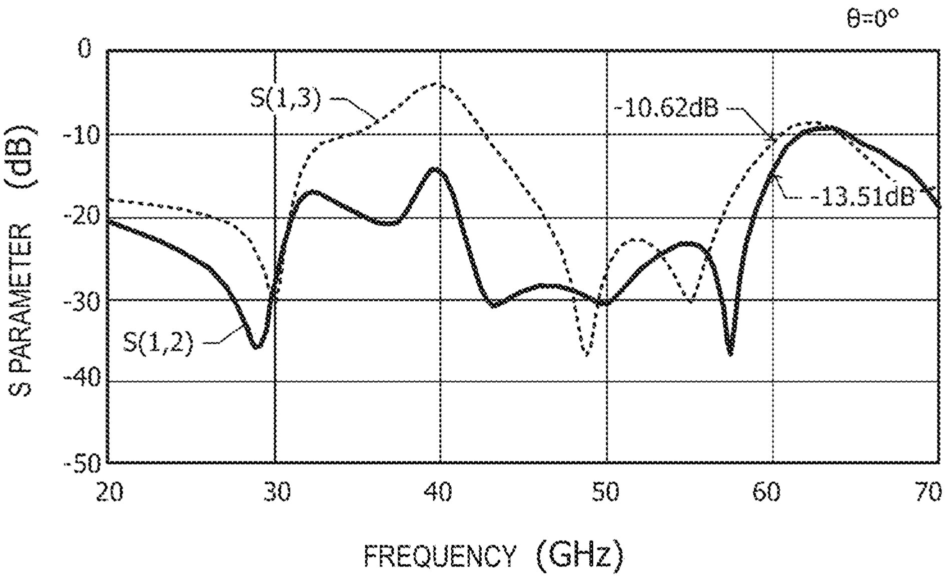
FIG. 9A and FIG. 9B are graphs illustrating simulation results of pass coefficients S(1, 2) and S(1, 3) to the ports P2 and P3 for when a radio-frequency signal is input from the port P1.
Figure 9B:
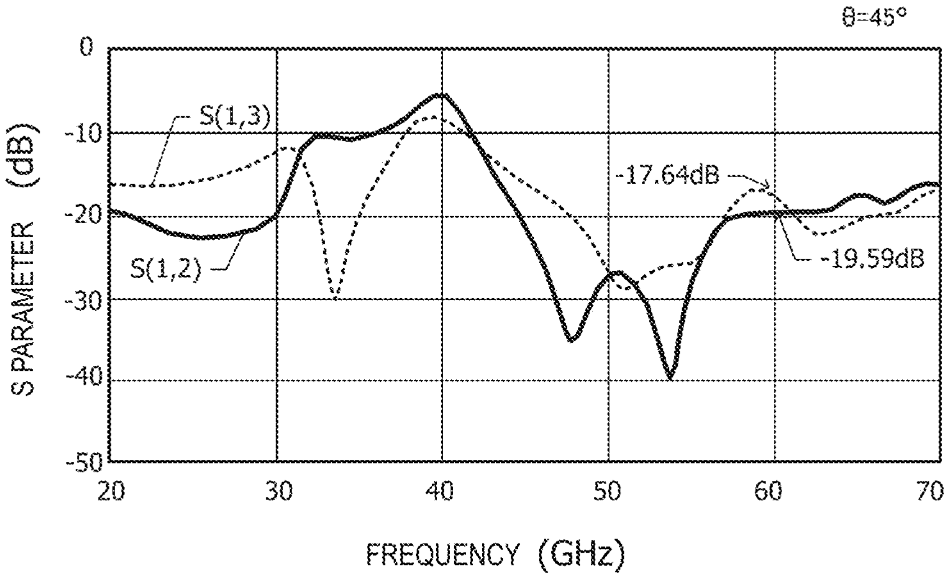

FIG. 9A and FIG. 9B are graphs illustrating simulation results for pass coefficients S(1, 2) and S(1, 3) to the ports P2 and P3 for when a radio-frequency signal is input from the port P1. The horizontal axis represents the frequency in units of "GHz" and the vertical axis represents the calculated value of the S-parameter in units of "dB". The solid line and the dashed line in the graphs illustrate the pass coefficients S(1, 2) and S(1, 3), respectively. FIG. 9A illustrates the simulation results for a state where the angle θ=0° and FIG. 9B for a state where the angle θ=45°.

A radio-frequency signal supplied from the port P1 to the second feed element 32 couples to the first feed element 31 and is output from the ports P2 and P3. The pass coefficients S(1, 2) and S(1, 3) are preferably small, since the isolation between the first feed element 31 and the second feed element 32 is preferably high. At the resonant frequency of 60 GHz of the second feed element 32, S(1, 2)=−13.5 dB and S(1, 3)=−10.62 dB when the angle θ=0°. In contrast, when the angle θ=45°, S(1, 2)=−19.59 dB and S(1, 3)=−17.64 dB. From these results, it is clear that an angle θ of 45° is preferable to an angle θ of 0° in terms of increasing isolation.

The pass coefficients S(1, 2) and S(1, 3) were obtained while varying the angle θ from 0° to 360°.

Figure 10:
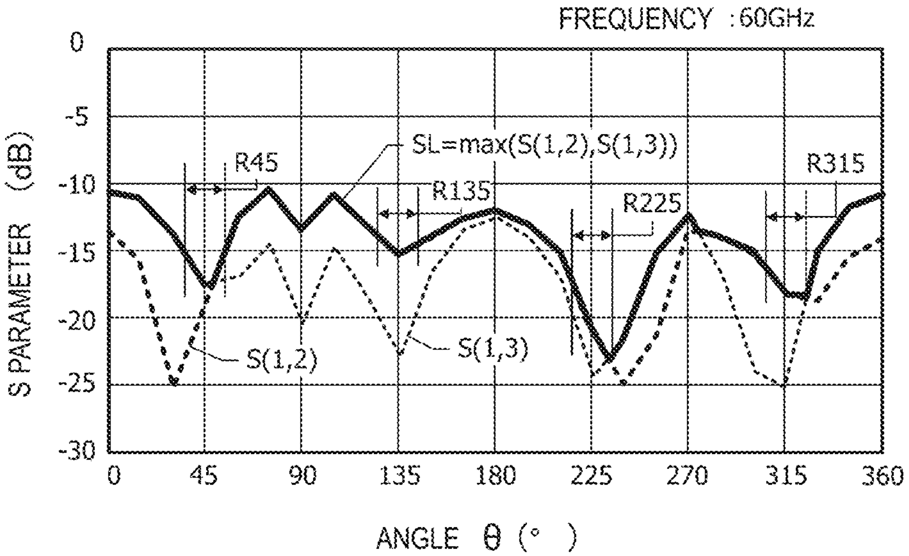
FIG. 10 is a graph illustrating the relationship between the pass coefficients S(1, 2) and S(1, 3) and the angle θ.

FIG. 10 is a graph illustrating the relationship between the pass coefficients S(1, 2) and S(1, 3) and the angle θ. The horizontal axis represents the angle θ in units of "degrees" and the vertical axis represents the calculated value of the S-parameter in units of "dB". The thick dashed line and the thin dashed line in the graph respectively represent the pass coefficients S(1, 2) and S(1, 3). The thick solid line in the graph is a line obtained by connecting the larger values (i.e., the worse characteristic) out of the values of the pass coefficients S(1, 2) and S(1, 3). A pass coefficient, which consists of the larger values out the values of the pass coefficients S(1, 2) and S(1, 3), is labelled SL. That is, SL=max(S(1, 2), S(1, 3)). It can be seen that the pass coefficient SL is small at R45, R135, R225, and R315 in the vicinity of points where the angle θ is 45°, 135°, 225°, and 315°. In other words, it can be seen that the pass coefficient SL is small in the vicinity of points where the angle θ is 45°+90°×n (n=0, 1, 2, 3).

In the range of the angle θ=45°+90°×n±10°, the pass coefficient SL is smaller than for the angle θ=0°+90°×n. In other words, the range where the angle θ=45°+90°×n±10° was found to be superior in terms of increasing isolation. In order to increase isolation, the feed points are preferably disposed so that the angle (the angle less than 90°) between a straight line passing through the geometric center O of the first feed element 31 and one of the feed points 31A and 31B and a straight line passing through the geometric center O of the second feed element 32 and one of the feed points 32A and 32B is greater than or equal to 35° and less than or equal to 55°.

Next, advantageous effects of the First Embodiment will be described.

In the First Embodiment, the second feed line 21A is disposed in the same first layer conductor layer 21 as the ground plane 21G (FIG. 1), which functions as a ground for the first feed element 31. Compared to a case where disposing a feed line in the first layer conductor layer 21 is not allowed, the degree of freedom in the arrangement of feed lines is increased. Since the second feed line 21A does not need to be disposed in another conductor layer, an advantageous effect is obtained that the degree of freedom in the arrangement of wiring lines in the other conductor layer is increased. As a result, an increase in the number of conductor layers can be suppressed and the antenna device can be reduced in thickness. As described with reference to the drawings from FIG. 3A to FIG. 6, there is little effect on the antenna characteristics even when the second feed line 21A is disposed in the same first layer conductor layer 21 as the ground plane 21G.

Next, modifications of the First Embodiment will be described.

In the First Embodiment, the second feed line 21A, which supplies radio-frequency signals having a phase difference of 90° to the two feed points 32A and 32B of the second feed element 32, is configured as a 90° hybrid circuit, but a transmission line of another configuration may instead be used as the second feed line 21A. For example, one transmission line may branch into two transmission lines, and the two transmission lines after branching may be respectively connected to the feed points 32A and 32B. In this case, in order to radiate circularly polarized waves, the difference in electrical length between the two transmission lines from the branching point to the two second feed points 32A and 32B may be ¼ of the wavelength corresponding to the resonant frequency of the second feed element 32.

The second feed element 32 may be equipped with a parasitic element. A wider bandwidth can be achieved by causing the second feed element 32 and the parasitic element to undergo double resonance.

Second Embodiment

Next, an antenna device according to a Second Embodiment will be described while referring to FIG. 11. Hereafter, description of parts of the configuration that are the same as in the antenna device according to the First Embodiment described while referring to the drawings in FIGS. 1 to 10 will be omitted.

Figure 11:
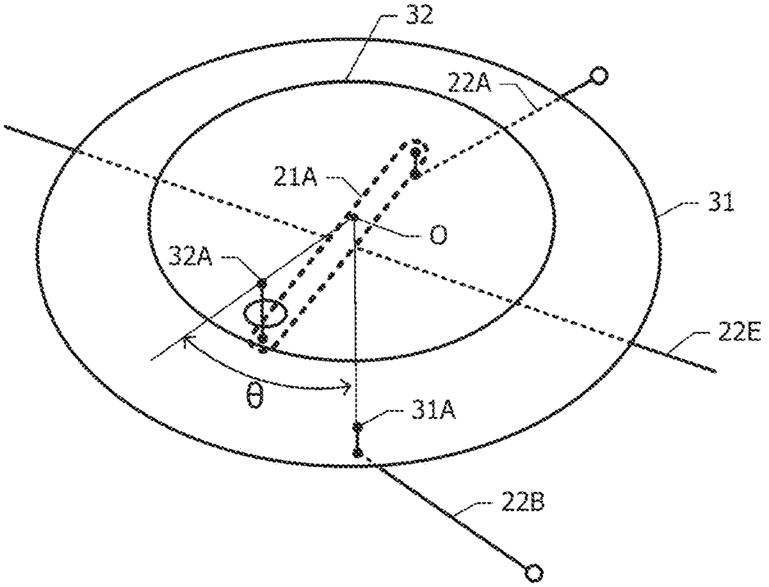
FIG. 11 is a schematic perspective view of an antenna device according to a Second Embodiment.

FIG. 11 is a schematic perspective view of the antenna device according to the Second Embodiment. In the antenna device according to the First Embodiment (FIG. 2), the first feed element 31 is provided with two feed points 31A and 31B, and the second feed element 32 is provided with two feed points 32A and 32B. In contrast, in the Second Embodiment, the first feed element 31 is provided with one feed point 31A and the second feed element 32 is provided with one feed point 32A.

In the First Embodiment, the second feed line 21A (FIG. 2) disposed in the first layer conductor layer 21 has a circular shape, whereas in the Second Embodiment, the second feed line 21A is shaped like a straight line, for example. One end of the second feed line 21A is connected to the feed point 32A of the second feed element 32 through a via V. The other end of the second feed line 21A is connected to the second layer second feed line 22A through a via V. A wiring line 22E disposed in the second layer conductor layer 22 intersects the second feed line 21A disposed in the first layer conductor layer 21 in plan view.

The feed point 32A and the second layer second feed line 22A are disposed on opposite sides from each other as seen from the wiring line 22E. In plan view, the angle between a straight line passing through the geometric center O of the first feed element 31 and the feed point 31A and a straight line passing through the geometric center O of the second feed element 32 and the feed point 32A is labeled θ. As the angle θ is varied, the isolation between the first feed element 31 and the second feed element 32 changes.

Next, advantageous effects of the Second Embodiment will be described.

In the Second Embodiment as well, similarly to as in the First Embodiment, the second feed line 21A is disposed in the same first layer conductor layer 21 (FIG. 1) as the ground plane 21G (FIG. 1). Therefore, an advantageous effect is obtained that the degree of freedom in the arrangement of feed lines is increased. For example, the wiring line 22E, which intersects the second feed line 21A, can be disposed in the same second layer conductor layer 22 (FIG. 1) as the second layer second feed line 22A.

In the Second Embodiment, linearly polarized radio waves are radiated from the first feed element 31 and the second feed element 32. The isolation between the first feed element 31 and the second feed element 32 is highest when the polarization planes of the two sets of linearly polarized waves are perpendicular to each other. The angle θ is preferably 90° in order to increase isolation. Based on substantially the same concept as in the First Embodiment described with reference to FIG. 10, the angle θ is preferably greater than or equal to 80° and less than or equal to 100°.

Next, a modification of the Second Embodiment will be described. In the Second Embodiment, the first feed element 31 and the second feed element 32 are each provided with one feed point, but one feed element may instead be provided with two feed points. When the second feed element 32 is provided with two feed points, the second feed line 21A is preferably disposed so that there is a 90° phase difference between the radio-frequency signals supplied to the two feed points, similarly to as in the First Embodiment (FIG. 2).

Third Embodiment

Next, an antenna device according to a Third Embodiment will be described while referring to FIGS. 12A and 12B. Hereafter, description of parts of the configuration that are the same as in the antenna device according to the First Embodiment described while referring to the drawings in FIGS. 1 to 10 will be omitted.

Figure 12A:
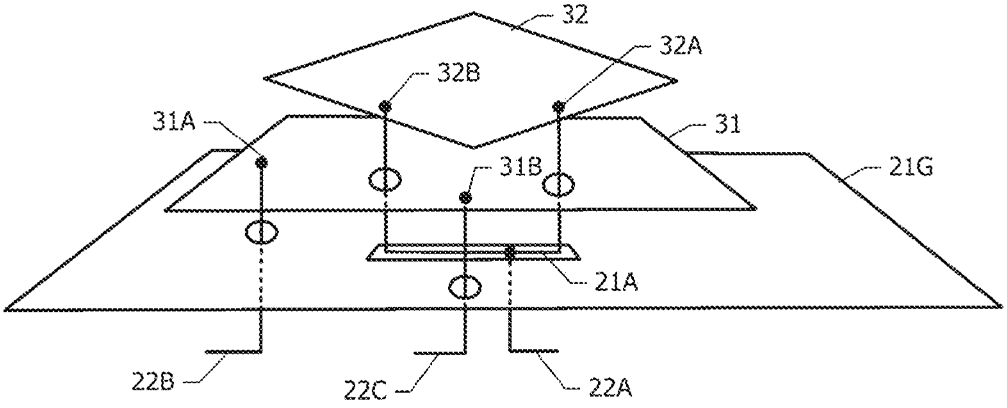
FIG. 12A is a schematic perspective view of an antenna device according to a Third Embodiment.
Figure 12B:
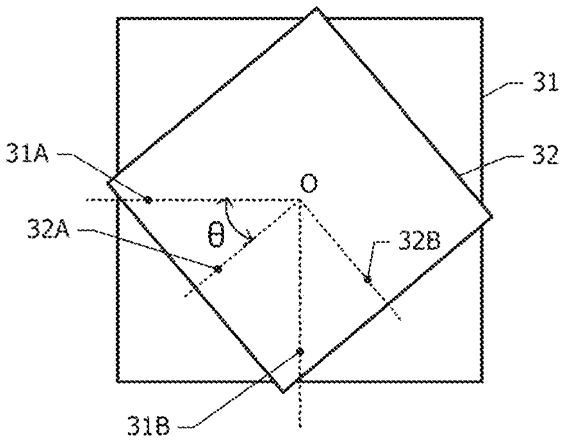
FIG. 12B is a plan view illustrating the positional relationship between the first feed element and the second feed element.

FIG. 12A is a schematic perspective view of the antenna device according to the Third Embodiment, and FIG. 12B is a plan view illustrating the positional relationship between the first feed element 31 and the second feed element 32. In the antenna device according to the First Embodiment, the first feed element 31 and the second feed element 32 have circular shapes. In contrast, in the Third Embodiment, the first feed element 31 and the second feed element 32 have square shapes. The two feed points 31A and 31B of the first feed element 31 are disposed on line segments connecting the midpoints of two adjacent sides of the first feed element 31 and the geometric center O of the first feed element 31. Similarly, the two feed points 32A and 32B of the second feed element 32 are disposed on line segments connecting the midpoints of two adjacent sides of the second feed element 32 and the geometric center O of the second feed element 32.

Similarly to as in the First Embodiment, the angle (angle less than 90°) between a straight line passing through the geometric center O of the first feed element 31 and one feed point 31A of the first feed element 31 and a straight line passing through the geometric center O of the second feed element 32 and one feed point 32A of the second feed element 32 is labeled θ. In the First Embodiment, the second feed element 32 is disposed inside the outer periphery of the first feed element 31 in plan view. In contrast, in the Third Embodiment, the areas near the vertices of the second feed element 32 may protrude outside the first feed element 31 in plan view.

Similarly to as in the First Embodiment, the second feed line 21A is disposed in the same first layer conductor layer 21 as the ground plane 21G. In FIG. 12A, the second feed line 21A is illustrated as being shaped like a straight line, but the second feed line 21A may instead have a circular shape similarly to as in the First Embodiment (FIG. 2).

Next, advantageous effects of the Third Embodiment will be described.

Similarly to as in the First Embodiment, in the Third Embodiment as well, an advantageous effect is obtained that the degree of freedom in the arrangement of feed lines is increased. The angle θ is preferably greater than or equal to 35° and less than or equal to 55° in order to increase the isolation between the first feed element 31 and the second feed element 32.

Next, a modification of the Third Embodiment will be described. In the Third Embodiment, the shape of the first feed element 31 and the second feed element 32 in plan view is square, but other shapes may be used. For example, a rectangular shape, a rectangular shape having the four corners thereof cut out in square shapes, and so forth may be used One out of the first feed element 31 and the second feed element 32 may have a radial shape and the other may have a circular shape. The first feed element 31 and the second feed element 32 can be formed in various shapes, but whatever shapes are used, the resonant frequency of the first feed element 31 is preferably lower than the resonant frequency of the second feed element 32.

Fourth Embodiment

Next, a communication device according to a Fourth Embodiment will be described while referring to FIGS. 13 and 14. The communication device according to the Fourth Embodiment includes an antenna device according to any of the First to Third Embodiments or an antenna device according to any modification of the embodiments.

Figure 13:
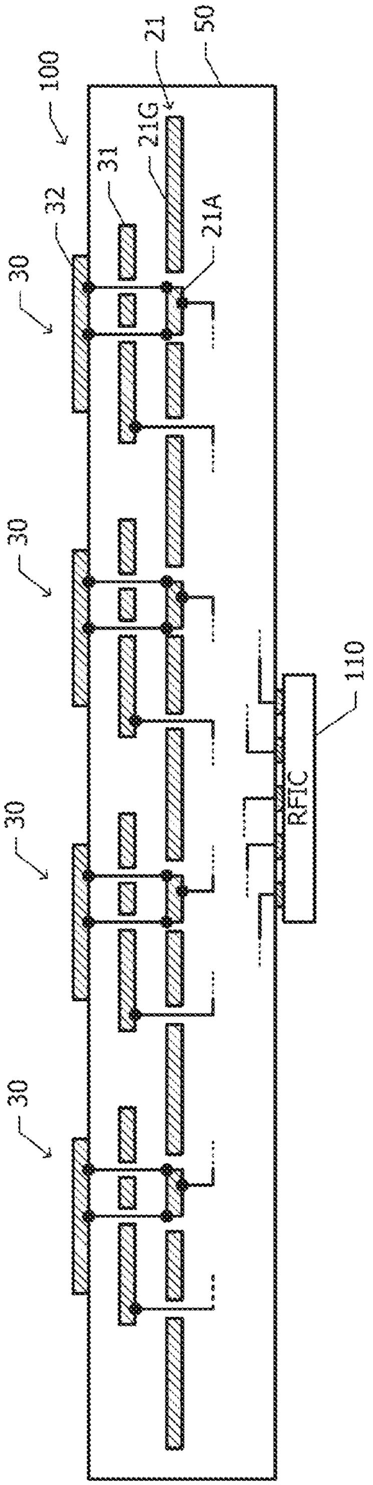
FIG. 13 is a sectional view of an antenna module included in a communication device according to a Fourth Embodiment.

FIG. 13 is a sectional view of an antenna module 100 included in the communication device according to the Fourth Embodiment. Multiple antenna elements 30 are provided on a single dielectric multilayer substrate 50. The multiple antenna elements 30 are disposed in a one-dimensional or two-dimensional array and constitute an array antenna.

Each of the multiple antenna elements 30 includes the first feed element 31 and the second feed element 32. The inside of the dielectric multilayer substrate 50 contains the first layer conductor layer 21 and a multilayer wiring line structure below the first layer conductor layer 21. The first layer conductor layer 21 contains the ground plane 21G and the second feed lines 21A, one of which is disposed for each antenna element 30. The configurations of the ground plane 21G, the second feed lines 21A, the first feed elements 31, and the second feed elements 32 are the same as in the configuration of the antenna device according to any of the First to Third Embodiments.

A radio-frequency integrated circuit element (RFIC) 110 is mounted on the bottom surface of the dielectric multilayer substrate 50. The radio-frequency integrated circuit element 110 is connected to the first feed elements 31 and the second feed elements 32 of the multiple antenna elements 30 via wiring lines provided inside the dielectric multilayer substrate 50.

Figure 14:
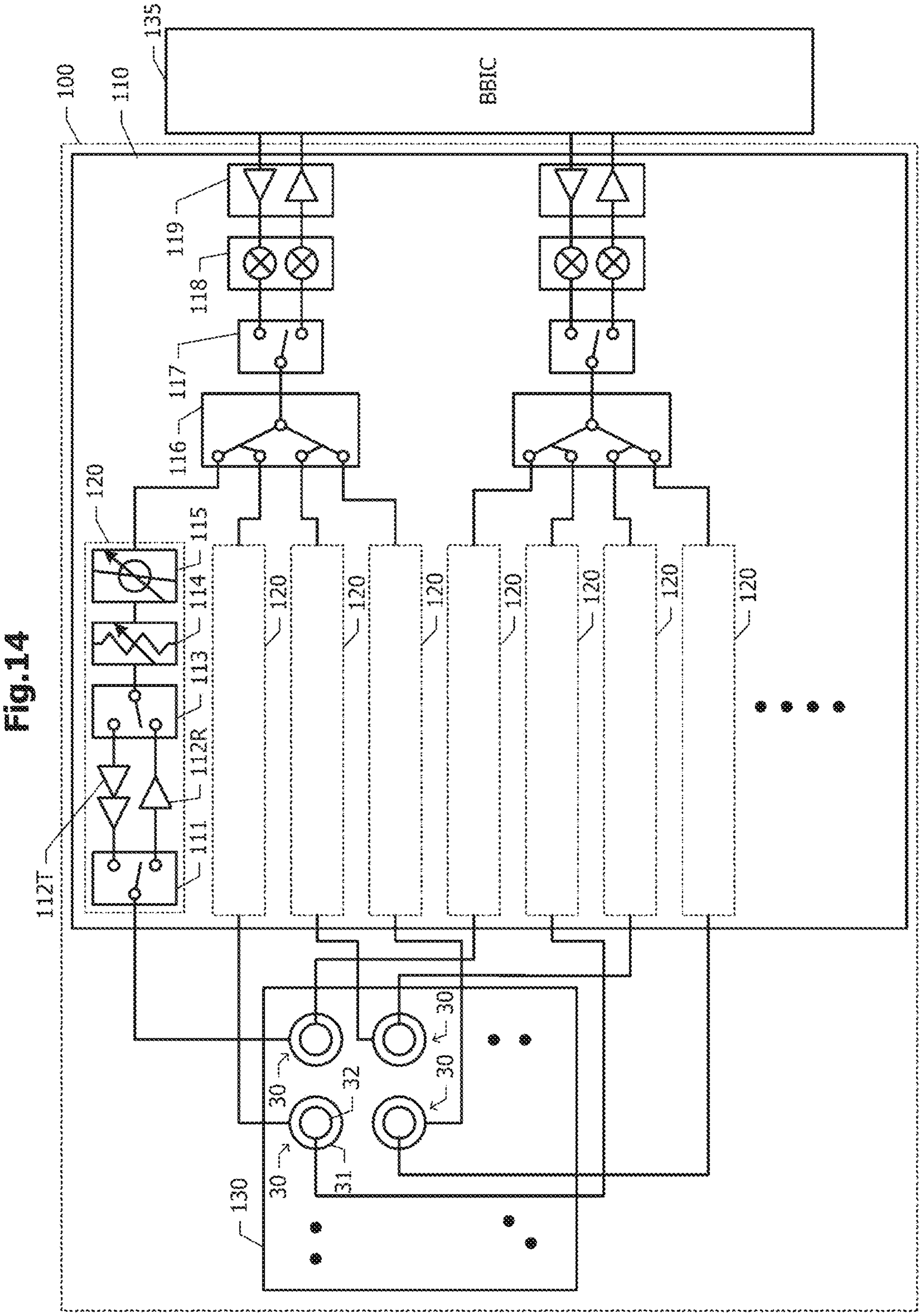
FIG. 14 is a block diagram of the communication device according to the Fourth Embodiment.

FIG. 14 is a block diagram of the communication device according to the Fourth Embodiment. The communication device according to the Fourth Embodiment includes the antenna module 100 and a baseband integrated circuit element (BBIC) 135. The antenna module 100 includes the radio-frequency integrated circuit element 110 and an antenna device 130. The antenna device 130 includes a plurality of the antenna elements 30.

The antenna module 100 up converts a baseband signal or an intermediate-frequency signal input from the baseband integrated circuit element 135 into a radio-frequency signal and transmits the radio-frequency signal from the antenna device 130. Furthermore, a radio-frequency signal received by the antenna device 130 is down-converted and output to the baseband integrated circuit element 135.

Next, the configuration and functions of the radio-frequency integrated circuit element 110 will be described. The radio-frequency integrated circuit element 110 includes multiple transmission-reception systems 120. Each of the multiple transmission-reception systems 120 includes a phase shifter 115, an attenuator 114, a switch 113, a power amplifier 112T, a low-noise amplifier 112R, and a switch 111. A multiplexer-demultiplexer 116, a switch 117, a mixer 118, and an amplification circuit 119 are provided for every four transmission-reception systems. The multiple transmission-reception systems 120 include a transmission-reception system 120 that processes a signal to be transmitted or received by the low-frequency-side first feed element 31 of the corresponding antenna element 30 and a transmission-reception system 120 that processes a signal to be transmitted or received by the high-frequency-side second feed element 32 of the corresponding antenna element 30.

A signal to be transmitted is input from the baseband integrated circuit element 135 to the amplification circuit 119. The amplification circuit 119 amplifies the input signal, and the mixer 118 up converts the amplified signal. The up-converted radio-frequency signal is input to the multiplexer-demultiplexer 116 via the switch 117. Multiple radio-frequency signals split by the multiplexer-demultiplexer 116 are input to the phase shifters 115 of the respective transmission-reception systems 120.

The radio-frequency signal, which received a prescribed phase delay in the phase shifter 115, is supplied to the corresponding antenna element 30 of the antenna device 130 via the attenuator 114, the switch 113, the power amplifier 112T, and the switch 111.

A radio-frequency signal received by the antenna element 30 is input to the multiplexer-demultiplexer 116 via the switch 111, the low-noise amplifier 112R, the switch 113, the attenuator 114, and the phase shifter 115. A reception signal generated through multiplexing performed by the multiplexer-demultiplexer 116 is input to the mixer 118 via the switch 117. The mixer 118 down converts the reception signal. The signal down-converted by the mixer 118 is input to baseband integrated circuit element 135 via the amplification circuit 119.

Next, advantageous effects of the Fourth Embodiment will be described.

The communication device according to the Fourth Embodiment includes an antenna device according to any one of the First to Third Embodiments. Therefore, similarly to the First to Third Embodiments, an advantageous effect is obtained that the degree of freedom in the arrangement of feed lines inside the antenna device is increased. Therefore, an increase in the number of conductor layers within the dielectric multilayer substrate 50 (FIG. 13) can be suppressed. Since an increase in the number of conductor layers is suppressed, the antenna module can be reduced in thickness.

Fifth Embodiment

Next, an antenna device according to a Fifth Embodiment will be described while referring to FIG. 15. Hereafter, description of parts of the configuration that are the same as in the antenna device according to the First Embodiment described while referring to the drawings in FIGS. 1 to 10 will be omitted.

Figure 15:
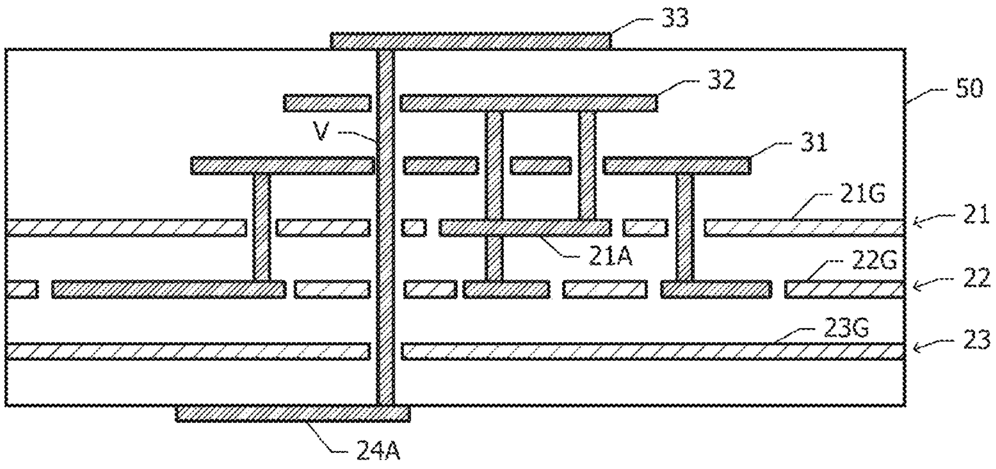
FIG. 15 is a sectional view of an antenna device according to a Fifth Embodiment.

FIG. 15 is a sectional view of the antenna device according to the Fifth Embodiment. The antenna device according to the First Embodiment (FIG. 1) includes two feed elements, namely, the first feed element 31 and the second feed element 32. In contrast, the antenna device according to the Fifth Embodiment includes, in addition to the first feed element 31 and the second feed element 32, a flat-plate-shaped third feed element 33 that is disposed so as to be spaced apart from the second feed element 32. In plan view, the third feed element 33 partially overlaps the second feed element 32. In other words, the first feed element 31, the second feed element 32, and the third feed element 33 are stacked in this order.

A third feed line 24A is disposed below the third layer conductor layer 23. The third feed line 24A is connected to the third feed element 33 by a via V passing through clearance holes provided in the ground planes 23G, 22G, and 21G, the first feed element 31, and the second feed element 32.

The resonant frequency of the third feed element 33 is higher than the resonant frequency of the second feed element 32. The area of the third feed element 33 in plan view is smaller than the area of the second feed element 32 in plan view.

Next, advantageous effects of the Fifth Embodiment will be described.

The antenna device according to the Fifth Embodiment is able to transmit and receive radio waves of three frequency bands. In addition, similarly to as in the First Embodiment, the second feed line 21A is disposed in the same first layer conductor layer 21 as the ground plane 21G, and therefore an advantageous effect is obtained that the degree of freedom in the arrangement of feed lines is increased.

Next, a modification of the Fifth Embodiment will be described. In the Fifth Embodiment, the resonant frequency of the third feed element 33 is higher than the resonant frequency of the second feed element 32, but conversely, a configuration may be adopted in which the resonant frequency of the second feed element 32 is higher than the resonant frequency of the third feed element 33. In this case, the resonant frequency of the first feed element 31 is lower than the resonant frequency of either the second feed element 32 or the third feed element 33.

In the Fifth Embodiment, the second feed line 21A, which is connected to the second feed element 32, is disposed in the same first layer conductor layer 21 as the ground plane 21G. Instead of or in addition to the second feed line 21A, a feed line connected to the third feed element 33 may be disposed in the first layer conductor layer 21. In this case, the feed line disposed in the first layer conductor layer 21 is preferably disposed inside the outer periphery of the first feed element 31 in plan view.

In the Fifth Embodiment, three feed elements, namely, the first feed element 31, the second feed element 32, and the third feed element 33 are stacked, but four or more flat-plate-shaped feed elements may instead be stacked. In the Fifth Embodiment, the third feed line 24A, which is connected to the third feed element 33, is disposed below the third layer conductor layer 23, but may instead be disposed in the second layer conductor layer 22.

Each of the above-described embodiments is an illustrative example and it goes without saying that parts of the configurations illustrated in different embodiments can be substituted for one another or combined with each other. The same operational effects resulting from the same configurations in a plurality of embodiments are not repeatedly described in the individual embodiments. In addition, the present invention is not limited to the above-described embodiments. For example, it will be clear to a person skilled in the art that various changes, improvements, and combinations are possible.

REFERENCE SIGNS LIST

21 first layer conductor layer
21A first layer second feed line
21G ground plane
21X wiring line
22 second layer conductor layer
22A second layer second feed line
22B, 22C first feed line
22D second layer second feed line
22E wiring line
22G ground plane
22X, 22Y wiring line
23 third layer conductor layer
23G ground plane
24A third feed line
30 antenna element
31 first feed element
31A, 31B feed point
32 second feed element
32A, 32B feed point
33 third feed element
50 dielectric multilayer substrate
100 antenna module
110 radio-frequency integrated circuit element (RFIC)
111 switch
112T power amplifier
112R low-noise amplifier
113 switch
114 attenuator
115 phase shifter
116 multiplexer-demultiplexer
117 switch
118 mixer
119 amplification circuit
120 transmission-reception system
130 antenna device
135 baseband integrated circuit element (BBIC)

The invention claimed is:

1. An antenna device comprising:
a ground plane;
a flat-plate-shaped first feed element;
a flat-plate-shaped second feed element;
a first feed line connected to the first feed element; and
a second feed line connected to the second feed element, wherein
the ground plane, the first feed element, and the second feed element are stacked in respective order and spaced apart from each other,
at least part of the second feed line is disposed in a same conductor layer as the ground plane,
the ground plane functions as a ground for the first feed element, and the at least part of the second feed line is disposed at a position that overlaps the first feed element as the ground plane is viewed from a plan view,
the ground plane and the at least part of the second feed line are disposed on a first surface of a first dielectric layer,
the first feed element is disposed on a second surface of the first dielectric layer opposite to the first surface,
the second feed line includes a 90° hybrid circuit formed by patterns arranged in the same conductor layer as the ground plane, and
the 90° hybrid circuit is configured to supply high-frequency signals having a phase difference of 90° to the second feed element.

2. The antenna device according to claim 1,
wherein a resonant frequency of the first feed element is lower than a resonant frequency of the second feed element.

3. The antenna device according to claim 2,
wherein an area of the first feed element is greater than an area of the second feed element in the plan view.

4. The antenna device according to claim 2,
wherein the second feed line is connected to two second feed points of the second feed element, and two straight lines respectively passing through a geometric center of the second feed element and the two second feed points are perpendicular to each other.

5. The antenna device according to claim 2, further comprising:
a flat-plate-shaped third feed element that is spaced apart from the second feed element and partially overlaps the second feed element as viewed from the plan view; and
a third feed line connected to the third feed element.

6. The antenna device according to claim 1,
wherein an area of the first feed element is greater than an area of the second feed element in the plan view.

7. The antenna device according to claim 6,
wherein the second feed line is connected to two second feed points of the second feed element, and two straight lines respectively passing through a geometric center of the second feed element and the two second feed points are perpendicular to each other.

8. The antenna device according to claim 6, further comprising:
a flat-plate-shaped third feed element that is spaced apart from the second feed element and partially overlaps the second feed element as viewed from the plan view; and
a third feed line connected to the third feed element.

9. The antenna device according to claim 1,
wherein the second feed line is connected to two second feed points of the second feed element, and two straight lines respectively passing through a geometric center of the second feed element and the two second feed points are perpendicular to each other.

10. The antenna device according to claim 9, wherein
the second feed line includes an annular-shaped transmission line consisting of two relatively thick transmission lines and two relatively thin transmission lines connected to each other in an alternating manner, each of the two relatively thick transmission lines being thicker than either of the two relatively thin transmission lines,
at least one of the two relatively thick transmission lines being disposed between a location where a radio-frequency signal is input to the second feed line and a location connected to one of the two second feed points, and
at least one of the relatively thin transmission lines is connected between the two feed points.

11. The antenna device according to claim 6,
wherein the second feed line includes a part where the second feed line branches, at a branching point, from one line and extends to the two second feed points, and a difference in electrical length from the branching point to the two second feed points is ¼ a wavelength of a radio-frequency signal having the resonant frequency of the second feed element.

12. The antenna device according to claim 11,
wherein the first feed line is connected to at least one first feed point of the first feed element, and
from the plan view, an angle between a straight line passing through a geometric center of the first feed element and the first feed point and a straight line passing through a geometric center of the second feed element and one of the second feed points is greater than or equal to 35° and less than or equal to 55°.

13. The antenna device according to claim 11, further comprising:
a flat-plate-shaped third feed element that is spaced apart from the second feed element and partially overlaps the second feed element as viewed from the plan view; and
a third feed line connected to the third feed element.

14. The antenna device according to claim 1, further comprising:
a flat-plate-shaped third feed element that is spaced apart from the second feed element and partially overlaps the second feed element as viewed from the plan view; and
a third feed line connected to the third feed element.

15. An antenna device, comprising:
a ground plane;
a flat-plate-shaped first feed element;
a flat-plate-shaped second feed element;
a first feed line connected to the first feed element; and
a second feed line connected to the second feed element, wherein
the ground plane, the first feed element, and the second feed element are stacked in respective order and spaced apart from each other, and
at least part of the second feed line is disposed in a same conductor layer as the ground plane, wherein the ground plane functions as a ground for the first feed element, and the at least part of the second feed line is disposed at a position that overlaps the first feed element as the ground plane is viewed from a plan view,
wherein
the ground plane and the at least part of the second feed line are disposed on a first surface of a first dielectric layer,
the first feed element is disposed on a second surface of the first dielectric layer opposite to the first surface,
the second feed line is connected to two second feed points of the second feed element, and two straight lines respectively passing through a geometric center of the second feed element and the two second feed points are perpendicular to each other, and
the second feed line comprising a conductive material that conveys radio-frequency signals to the two second feed points with a phase difference of 90° between a signal component present in the radio-frequency signals that has a frequency that is a resonant frequency of the second feed element.

16. The antenna device according to claim 15, further comprising:
a flat-plate-shaped third feed element that is spaced apart from the second feed element and partially overlaps the second feed element as viewed from the plan view; and
a third feed line connected to the third feed element.

17. An antenna device, comprising:
a ground plane;
a flat-plate-shaped first feed element;
a flat-plate-shaped second feed element;
a first feed line connected to the first feed element; and
a second feed line connected to the second feed element, wherein
the ground plane, the first feed element, and the second feed element are stacked in respective order and spaced apart from each other, and
at least part of the second feed line is disposed in a same conductor layer as the ground plane, wherein the ground plane functions as a ground for the first feed element, and the at least part of the second feed line is disposed at a position that overlaps the first feed element as the ground plane is viewed from a plan view, wherein the ground plane and the at least part of the second feed line are disposed on a first surface of a first dielectric layer, the first feed element is disposed on a second surface of the first dielectric layer opposite to the first surface, the second feed line is connected to two second feed points of the second feed element, and two straight lines respectively passing through a geometric center of the second feed element and the two second feed points are perpendicular to each other, and the second feed line includes a 90° hybrid circuit having four ports, a radio-frequency signal is input to one port of the 90° hybrid circuit, and another two ports of the 90° hybrid circuit are respectively connected to the two second feed points.

18. An antenna device, comprising:

a ground plane;

a flat-plate-shaped first feed element;

a flat-plate-shaped second feed element;

a first feed line connected to the first feed element; and a second feed line connected to the second feed element, wherein the ground plane, the first feed element, and the second feed element are stacked in respective order and spaced apart from each other, and at least part of the second feed line is disposed in a same conductor layer as the ground plane, wherein the ground plane functions as a ground for the first feed element, and the at least part of the second feed line is disposed at a position that overlaps the first feed element as the ground plane is viewed from a plan view, wherein the ground plane and the at least part of the second feed line are disposed on a first surface of a first dielectric layer, the first feed element is disposed on a second surface of the first dielectric layer opposite to the first surface, the second feed line is connected to two second feed points of the second feed element, and two straight lines respectively passing through a geometric center of the second feed element and the two second feed points are perpendicular to each other, the first feed line is connected to at least one first feed point of the first feed element, and from the plan view, an angle between a straight line passing through a geometric center of the first feed element and the first feed point and a straight line passing through a geometric center of the second feed element and one of the second feed points is greater than or equal to 35° and less than or equal to 55°.

19. The antenna device according to claim 18, wherein the first feed element includes another first feed point, and two straight lines respectively passing through the geometric center of the first feed element and the first feed point and the another first feed point are perpendicular to each other.

20. The antenna device according to claim 18, further comprising:

a flat-plate-shaped third feed element that is spaced apart from the second feed element and partially overlaps the second feed element as viewed from the plan view; and a third feed line connected to the third feed element.

* * * * *